United States Patent
Kastner

(10) Patent No.: US 6,648,243 B1
(45) Date of Patent: Nov. 18, 2003

(54) FERTILIZER AND INSECTICIDE CAPSULE

(76) Inventor: Norbert B. Kastner, 164 Mentor Dr., Naples, FL (US) 34110

(*) Notice: Subject to any disclaimer, the term of this patent is extended or adjusted under 35 U.S.C. 154(b) by 9 days.

(21) Appl. No.: 10/184,826

(22) Filed: Jun. 28, 2002

(51) Int. Cl.[7] .................................................. A62C 5/02
(52) U.S. Cl. ........................ 239/310; 239/330; 137/268
(58) Field of Search ............................... 239/310, 330, 239/334, 351, 362, 363; 137/268; 417/199.2, 200

(56) References Cited

U.S. PATENT DOCUMENTS

| | | | | |
|---|---|---|---|---|
| 3,669,537 A | * | 6/1972 | Overbey | 239/310 |
| 5,259,409 A | * | 11/1993 | Cervola | 137/268 |
| 5,699,827 A | * | 12/1997 | Delorme et al. | 239/310 |
| 5,806,769 A | * | 9/1998 | Womack | 239/310 |
| 6,173,732 B1 | * | 1/2001 | Davis et al. | 239/310 |

\* cited by examiner

*Primary Examiner*—Michael Powell Buiz
*Assistant Examiner*—Dinh Q. Nguyen

(57) ABSTRACT

A fertilizer and insecticide capsule attaching to an in-ground sprinkler system allowing lawn and garden chemicals to be dispensed simultaneously to a lawn or garden while watering it. Lawn and garden chemicals in tablet or liquid form can be used interchangeably with ease. This method of chemically treating a lawn or garden greatly reduces or eliminates chemical exposure to a user while dispensing chemicals onto a lawn or garden. The present invention is easy to install and use, and saves a user time by combining process of watering a lawn or garden with process of chemically treating a lawn or garden.

1 Claim, 3 Drawing Sheets

FERTILIZER AND INSECTICIDE CAPSULE

BACKGROUND OF THE INVENTION

1. Field of the Invention

The present invention relates to a fertilizer and insecticide capsule for use in connection with an in-ground sprinkler system. The fertilizer and insecticide capsule has particular utility in connection with dispensing lawn and garden chemicals simultaneously with water while watering a lawn.

2. Description of the Prior Art

Fertilizer and insecticide capsule are desirable to eliminate contact with harmful lawn and garden chemicals while dispensing chemicals evenly and thoroughly over lawn and garden.

The use of automatic fertilizers and insecticide capsules is known in the prior art. For example, U.S. Pat. No. 5,836,518 to Jester discloses fertilizer sprinkler system. However, the Jester '518 patent does not readily attach or adapt to an existing sprinkler system, and has further drawbacks of requiring complicated construction of a pipe system comprised of an open inboard portion, a closed outboard portion with a plurality of outlet valves, and an intermediate portion.

U.S. Pat. No. 5,178,181 to Craig discloses a fertilizer dispenser that is for use with a sprinkler line system. However, the Craig '181 patent does not address ease of assembly in attaching fertilizing dispenser to sprinkler system and additionally does not allow ease during use.

Similarly, U.S. Pat. No. 4,750,512 to Craig discloses a fertilizer container for a sprinkler system that provides a screen to hold the fertilizer and permits water to permeate therethrough. However, the Craig '512 patent does not allow replacing filter with fertilizer and insecticide capsule, and can not mix chemicals inside pump.

Lastly, U.S. Pat. No. 4,895,303 to Freyvogel discloses a sprinkler system fertilization regulator that automatically mixes a plurality of chemicals for the purpose of fertilization, weed control, or insect control. However, the Freyvogel '303 patent does not allow ease in assembly, and has the additional deficiency of being complicated to use and repair.

While the above-described devices fulfill their respective, particular objectives and requirements, the aforementioned patents do not describe a fertilizer and insecticide capsule that allows little or no contact with lawn and garden chemicals for person using invention while dispensing chemicals over lawn and garden. The Freyvogel patent makes no provision for fertilizer capsules attached to an existing sprinkler system.

Therefore, a need exists for a new and improved fertilizer and insecticide capsule that can be used for dispensing lawn and garden chemicals simultaneously with water while watering a lawn with little or no contact with chemicals for a person using invention. In this regard, the present invention substantially fulfills this need. In this respect, the fertilizer and insecticide capsule according to the present invention substantially departs from the conventional concepts and designs of the prior art, and in doing so provides an apparatus primarily developed for the purpose of dispensing lawn and garden chemicals simultaneously with water while watering a lawn with little or no contact with chemicals for a person using invention.

SUMMARY OF THE INVENTION

In view of the foregoing disadvantages inherent in the known types of automatic fertilizers and insecticide capsules now present in the prior art, the present invention provides an improved fertilizer and insecticide capsule, and overcomes the above-mentioned disadvantages and drawbacks of the prior art. As such, the general purpose of the present invention, which will be described subsequently in greater detail, is to provide a new and improved fertilizer and insecticide capsule that dispenses lawn and garden chemicals simultaneously with water while watering a lawn and garden which has all the advantages of the prior art mentioned heretofore and many novel features that result in a fertilizer and insecticide capsule which is not anticipated, rendered obvious, suggested, or even implied by the prior art, either alone or in any combination thereof.

To attain this, the present invention essentially comprises a fertilizer and insecticide capsule that attaches to a pump motor primer hole, to hoses between pump motor and dispenser, or replaces a filter and contains lawn and garden chemicals which mix with incoming water and is released through sprinkler hose heads onto a lawn or garden. The present invention chemically treats a lawn or garden while watering it, and reduces or eliminates a user's contact with harmful lawn and garden chemicals.

There has thus been outlined, rather broadly, the more important features of the invention in order that the detailed description thereof that follows may be better understood and in order that the present contribution to the art may be better appreciated.

The invention may also include a container for chemical tablets and a separate interchangeable container for chemical liquids. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fertilizer and insecticide capsule that has all of the advantages of the prior art automatic fertilizers and insecticide capsules and none of the disadvantages.

It is another object of the present invention to provide a new and improved fertilizer and insecticide capsule that may be easily and efficiently manufactured and marketed.

An even further object of the present invention is to provide a new and improved fertilizer and insecticide capsule that has a low cost of manufacture with regard to both materials and labor, and which accordingly is then susceptible of low prices of sale to the consuming public, thereby making such fertilizer and insecticide capsule economically available to the buying public.

Still another object of the present invention is to provide a new fertilizer and insecticide capsule that provides in the apparatuses and methods of the prior art some of the advantages thereof, while simultaneously overcoming some of the disadvantages normally associated therewith.

Even still another object of the present invention is to provide a fertilizer and insecticide capsule for dispensing lawn and garden chemicals simultaneously with water while watering a lawn with ease while saving time by combining the two processes. This allows a user to chemically treat a lawn or garden with little or no contact with chemicals.

Lastly, it is an object of the present invention to provide a new and improved method of dispensing lawn and garden chemicals from an in-ground sprinkler system while watering a lawn or garden.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
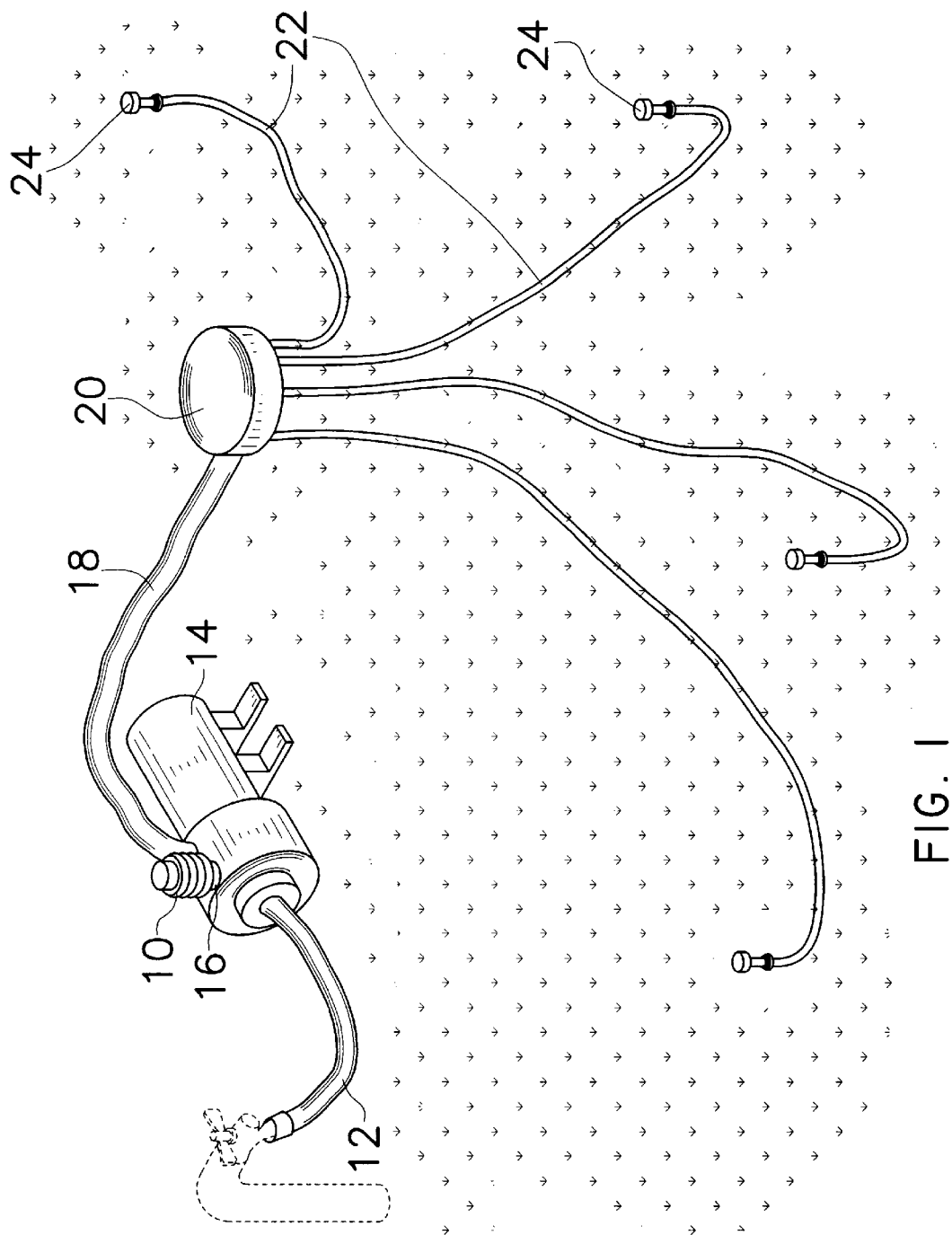
FIG. 1 is a side view of the preferred embodiment of the fertilizer and insecticide capsule constructed in accordance with the principles of the present invention.

Referring now to the drawings, and particularly to FIGS. 1–4, a preferred embodiment of the fertilizer and insecticide capsule of the present invention is shown and generally designated by the reference numeral 10.

In FIG. 1, a new and improved fertilizer and insecticide capsule 10 of the present invention for dispensing lawn and garden chemicals from an in-ground sprinkler system while watering a lawn or garden is illustrated and will be described. More particularly, the fertilizer and insecticide capsule 10 has an incoming hose 12 from a water source, attaching to a pump motor 14 and an outgoing hose 18 which transports water and chemical mixture to a distributor 20. FIG. 1 shows the distributor 20 that receives a water and chemical mixture from an outgoing hose 18 and transports it through several sprinkler hoses 22 and disperses it through sprinkler heads 24 at ends of sprinkler hoses 22. The water and chemical mixture is released from the sprinkler hoses 22 at sprinkler heads 24 on ends of sprinkler hoses 22 and dispersed onto a lawn or garden. FIG. 1 shows a method of dispensing lawn and garden chemicals from an in-ground sprinkler system while watering a lawn or garden. More particularly, FIG. 1 shows a method of releasing a chemical and water mixture from a fertilizer and insecticide capsule 10 through sprinkler hoses 22 onto a lawn or garden.

Figure 2:
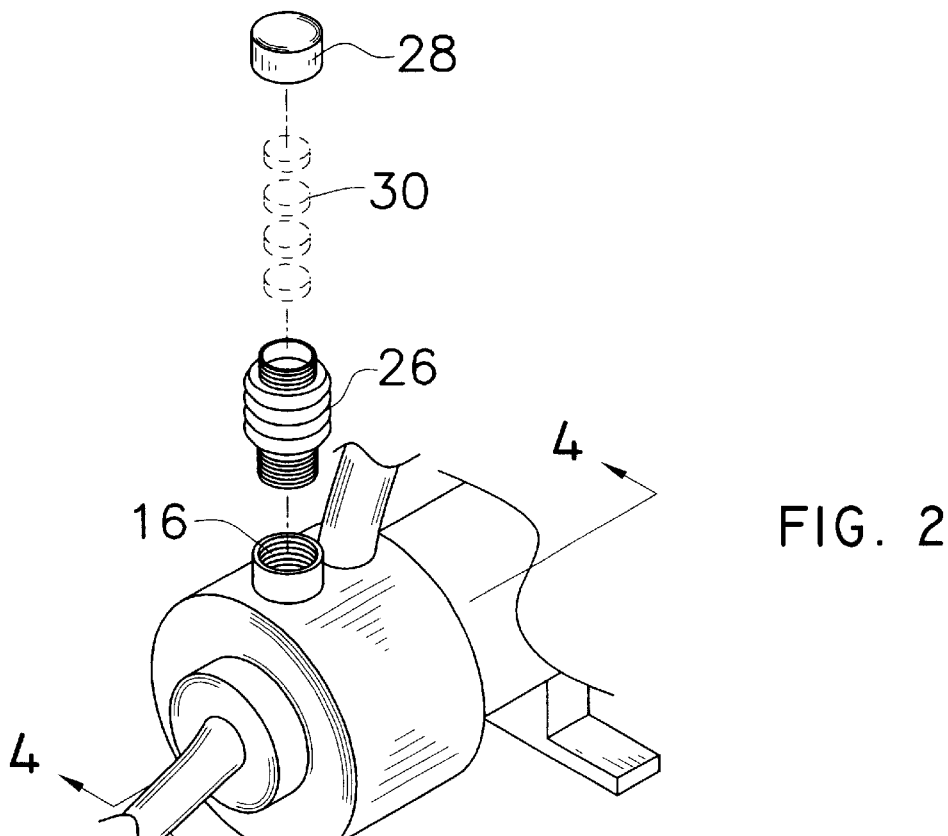
FIG. 2 is a sectional view of the fertilizer and insecticide capsule of the present invention.

FIG. 2 shows a removable, interchangeable fertilizer tablet container 26 for holding fertilizer tablets 30 attaches at top of fertilizer and insecticide capsule 10 by screwing in primer hole 16 of pump motor 14. Fertilizer tablet container 26 can be made of plastic, metal, glass or any other suitable material. Once fertilizer tablets 30 are placed inside fertilizer tablet container 26, a fertilizer tablet container cap 28 is screwed on top. FIG. 2 shows a method of attaching a fertilizer and insecticide capsule 10 into a primer hole 16 of a pump motor 14.

Figure 3:
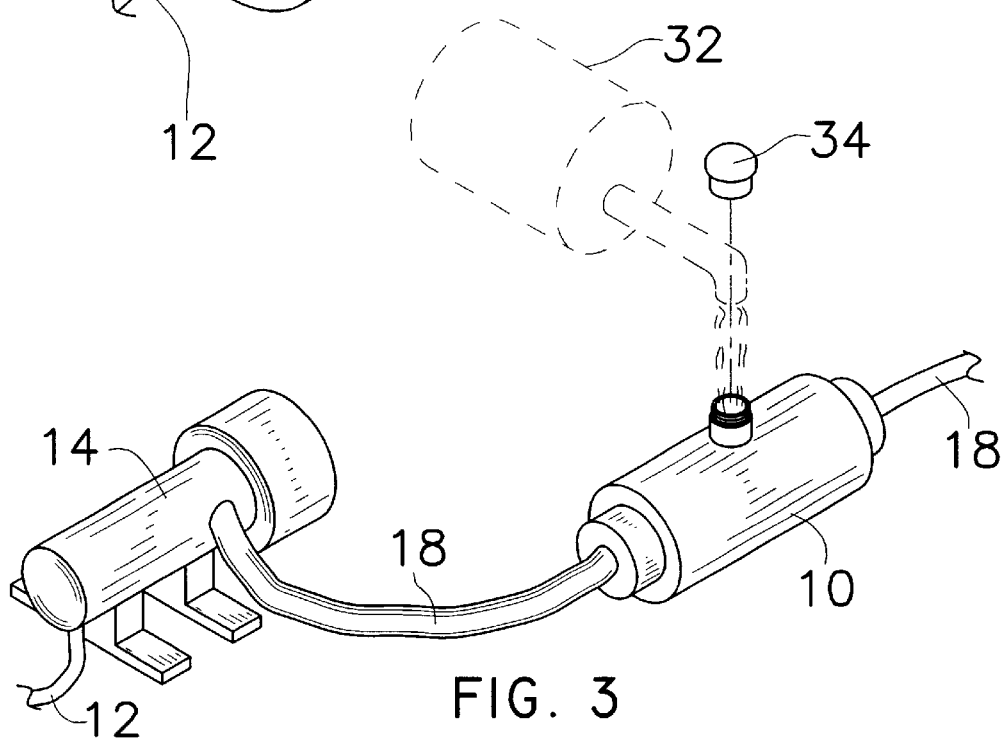
FIG. 3 is a sectional side view of the fertilizer and insecticide capsule of the present invention.

FIG. 3 shows a removable, interchangeable liquid container 32 for holding chemical liquids or powders which can be attached in the same manner and location as the fertilizer tablet container 26 and can be made of plastic, glass, metal or any other suitable material. A fertilizer and insecticide capsule cap 34 is attached at top of fertilizer and insecticide capsule 10 when neither the fertilizer tablet container 26 nor the liquid container 32 are attached. FIG. 3 also shows an alternative embodiment wherein a fertilizer and insecticide capsule 10 is attached between a pump motor 14 and a distributor 20 by connecting threads at bottom and top of fertilizer and insecticide capsule 10 to corresponding threads on outgoing hose 18 where it is divided to accommodate attachment of fertilizer and insecticide capsule 10. A fertilizer and insecticide capsule 10 can also be attached in this manner to replace a filter. FIG. 3 shows a method of attaching a fertilizer and insecticide capsule 10 to an in-ground sprinkler system in between a pump motor 14 and a distributor 20. FIG. 3 also shows a method of attaching a fertilizer and insecticide capsule 10 in place of a filter of an in-ground sprinkler system.

Figure 4:
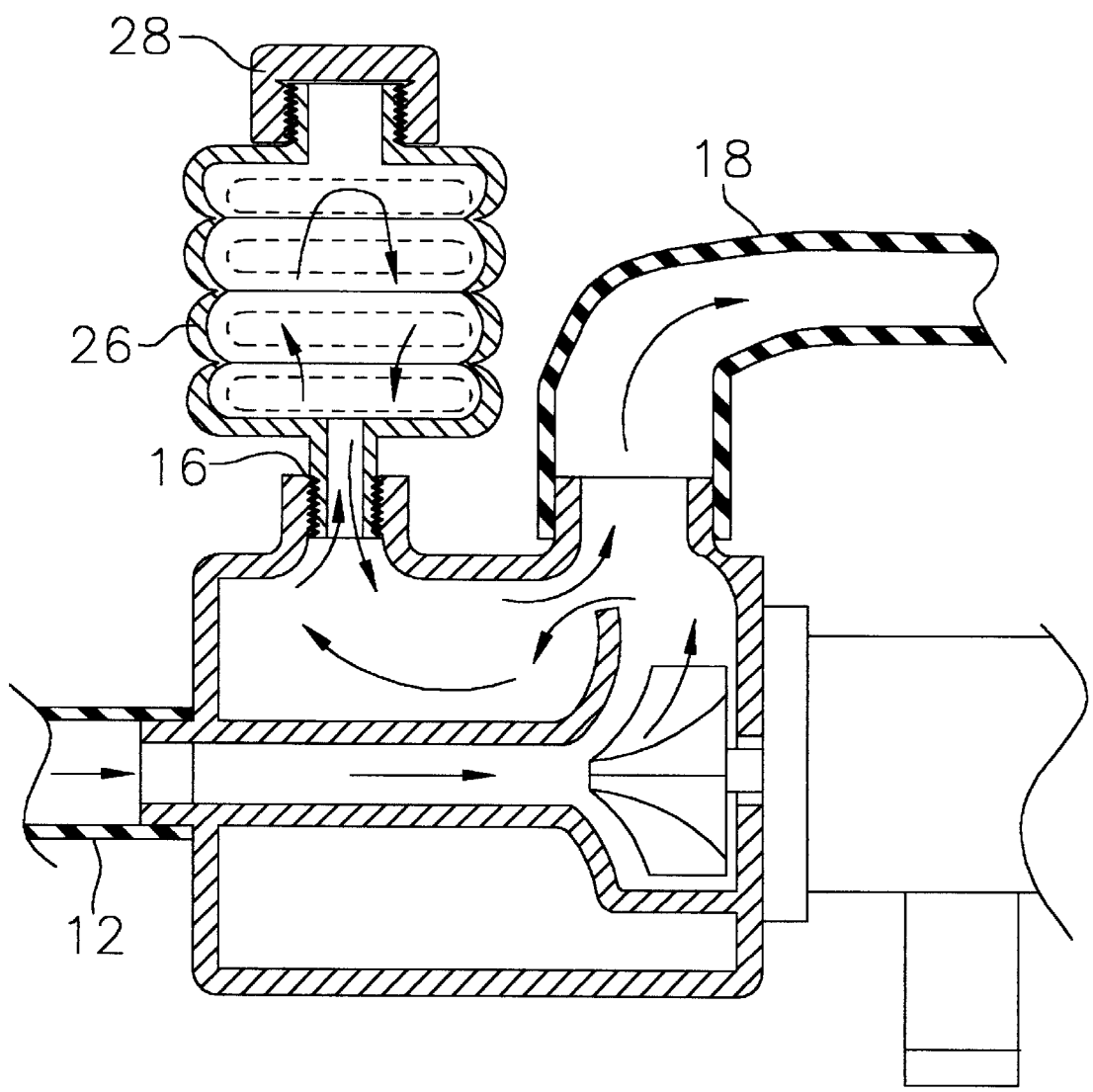
FIG. 4 is a cross sectional view of the fertilizer and insecticide capsule of the present invention.

FIG. 4 shows a cross sectional view of the present invention, showing flow of water into fertilizer tablet container 26 from incoming hose 12, mixing with fertilizer tablets 30 to create a water and chemical mixture which flows out of fertilizer tablet container 26 through outgoing hose 18. FIG. 4 also shows threads on bottom of fertilizer tablet container 26 and inside primer hole 16 which correspond to attach fertilizer tablet container 26 to pump motor 14 at primer hole 16. FIG. 4 also shows threads on top of fertilizer tablet container 26 which attach to a fertilizer tablet container cap 28.

FIG. 4 shows a method of placing lawn and garden chemicals into a fertilizer and insecticide capsule 10, allowing chemicals to mix with incoming water.

In use, it can now be understood that lawn and garden chemicals are easily dispersed with less risk of contact with harmful chemicals when using the present invention. While a preferred embodiment of the fertilizer and insecticide capsule has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal or a variety of plastic may be used instead of the plastic described. And although dispensing lawn and garden chemicals simultaneously with water while watering a lawn with little or no contact with chemicals for a person using invention have been described, it should be appreciated that the fertilizer and insecticide capsule herein described is also suitable for dispersing any suitable lawn or garden non-chemical tablet or liquid. Furthermore, a wide variety of sprinkler system may be used instead of the one described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fertilizer and insecticide capsule comprising:

a liquid container for holding lawn and garden chemicals that attaches to an in-ground sprinkler system to mix lawn and garden chemicals with water and disperse water and chemical mixture onto a lawn or garden;

a removable plastic tablet container for holding lawn and garden chemicals tablets;

a pump motor for connection to a water source by an incoming hose which releases water mixed with lawn and garden chemicals through an outgoing hose, said pump motor comprising a threaded primer hole;

threads on outer bottoms of the liquid container and the tablet container corresponding to said threaded primer hole of the pump motor for attaching to an in-ground sprinkler system; and a distributor to receive water mixed with lawn and garden chemicals from the outgoing hose of said pump motor and to release water mixed with lawn and garden chemicals through sprinkler hoses attached to sprinkler heads, allowing the sprinkler heads release water mixed with lawn and garden chemicals onto a lawn or garden.

* * * * *